(12) United States Patent
Honegger et al.

(10) Patent No.: US 7,989,972 B2
(45) Date of Patent: Aug. 2, 2011

(54) ELECTRO-MAGNETIC CLOSED-LOOP SPEED CONTROL FOR AIR-TURBINE SPINDLES

(75) Inventors: Andrew Edward Honegger, Chicago, IL (US); Andrew Gordon Phillip, Oshkosh, WI (US)

(73) Assignee: Microlution, Inc., Chicago, IL (US)

(*) Notice: Subject to any disclaimer, the term of this patent is extended or adjusted under 35 U.S.C. 154(b) by 1286 days.

(21) Appl. No.: 11/551,967

(22) Filed: Oct. 23, 2006

(65) Prior Publication Data

US 2008/0095625 A1    Apr. 24, 2008

(51) Int. Cl.
*F03D 9/00* (2006.01)
(52) U.S. Cl. .......................... 290/44; 290/55
(58) Field of Classification Search ............... 290/44, 290/55; 322/31, 44, 17
See application file for complete search history.

(56) References Cited

U.S. PATENT DOCUMENTS

| | | | | |
|---|---|---|---|---|
| 4,523,305 | A | * | 6/1985 | Cheeseboro ............... 369/33.01 |
| 4,749,930 | A | * | 6/1988 | Faville et al. ................. 318/696 |
| 5,010,722 | A | * | 4/1991 | Yamaguchi et al. ............. 57/124 |
| 5,576,905 | A | * | 11/1996 | Garcia et al. ............... 360/73.14 |

* cited by examiner

*Primary Examiner* — T C Patel
*Assistant Examiner* — Iraj A Mohandesi
(74) *Attorney, Agent, or Firm* — McDonnell Boehnen Hulbert & Berghoff LLP (57) ABSTRACT

A method an apparatus for providing speed control in a spindle system are provided. The apparatus includes an air turbine spindle that rotates at a speed, an electromagnetic device coupled to the spindle for creating a torque to maintain a desired speed of the spindle, and a tachometer for generating a measurement of the rotational speed of the spindle. The electromagnetic device applies a torque to the spindle in response to the measurement to change the speed of the spindle to the desired speed.

20 Claims, 6 Drawing Sheets

ELECTRO-MAGNETIC CLOSED-LOOP SPEED CONTROL FOR AIR-TURBINE SPINDLES

FIELD

The systems and methods described herein relate to implementing accurate, high-bandwidth speed control for rotating equipment used in mechanical machining operations. More particularly, this application relates to providing speed control for an air-turbine spindle via an auxiliary electromagnetic device.

BACKGROUND

Mechanical machining operations utilize a cutting tool to remove material from a workpiece to produce the desired finished geometry. Among the methods to accomplish mechanical machining, milling and drilling operations use a spindle to rotate the cutting tool that, when engaged with the workpiece, results in material removal. Turning, another method of mechanical machining, also uses a spindle to rotate the workpiece that, when engaged with the cutting tool, results in material removal.

The material removal process is dependent upon many parameters, including workpiece material, cutting tool material, lubrication, feed-rates and spindle speed. Spindle speed is important to produce the desired tangential velocity of the cutting tool (in the case of milling or drilling) or of the workpiece (in the case of turning). This tangential velocity, called the cutting speed, impacts the quality of the surface produced during the machining operation, and therefore must be tightly controlled to the desired setting for a given combination of workpiece and cutting tool materials. Furthermore, the spindle speed acts in conjunction with other machining parameters to determine characteristics such as chipload, that are also important to the performance of the machining operation. Several aspects of mechanical machining operations impart disturbance torques on the spindle and therefore affect the spindle speed, resulting in the requirement that the spindle-speed be actively controlled.

One form of speed control for a spindle is to use an electric motor and a motor drive to set the spindle speed. This method is robust but results in high costs, significant heat generation, and large mass. The cost, heat generation, and mass problems can be solved through the use of air-turbine driven spindles, however, the primary method to control the speed of these spindles, for high precision spindles, is through the modulation of the air pressure input to the spindle. This speed control method lacks accuracy and bandwidth due to the compressibility of air, the response time of control valves, and the speed at which the pressure signals reach the spindle (i.e., the speed of sound).

Air-turbine spindles offer several advantages including high rotational speed, low cost and high accuracy, but they lack high-performance (non-contact, high-accuracy, high-bandwidth) speed control functionality. Thus, it would be desirable to provide accurate, high-bandwidth speed control for air-turbine spindles.

SUMMARY

The systems and methods described herein implement closed-loop control of an auxiliary electromagnetic device connected in series with the air-turbine spindle to provide controlled torque to the spindle shaft and thereby control the speed of the spindle. The use of an auxiliary device to provide torque to control spindle speed and its implementation through non-contact electromagnetic forces solves many of the problems associated with other possible methods of speed control, such as air-pressure regulation.

One preferred embodiment is an apparatus for providing speed control to a spindle system. It comprises (i) an air turbine spindle that rotates at a speed, (ii) an electromagnetic device coupled to the spindle for creating a torque to maintain a desired speed of the spindle, and (iii) a tachometer for generating a measurement of the rotational speed of the spindle. The electromagnetic device applies a torque to the spindle in response to the measurement to change the speed of the spindle to the desired speed.

An embodiment of a method of providing speed control to an air turbine spindle system comprises (i) providing air power to an air turbine spindle to rotate the spindle at a speed, (ii) providing an electromagnetic device secured to the spindle, (iii) using a tachometer to generate a speed measurement of the spindle, (iv) comparing the speed measurement to the desired speed, and (v) adjusting the electromagnetic device to a torque sufficient to bring the speed measurement to the desired speed.

BRIEF DESCRIPTION OF THE DRAWINGS

Exemplary embodiments of the invention are described herein with reference to the drawings, in which.

DETAILED DESCRIPTION

An apparatus and method for providing speed control to a spindle system are described herein. The spindle system may be mounted onto a machine tool and connected to one or more air supplies to provide pressurized air to turn the air spindle and possibly an air bearing and connected to electrical power in the form of a standard 120V AC, etc. The spindle system is also preferably connected to a machine controller or drive system of the machine tool by a twisted pair of wires, or other interface, such as an RS-232 connection, USB, or other communication link. The machine controller may comprise a computer numerical control (CNC), for example. Alternatively, the spindle system includes a separate interface having a human-machine interface (HMI) from which it can obtain user input data.

Figure 1:
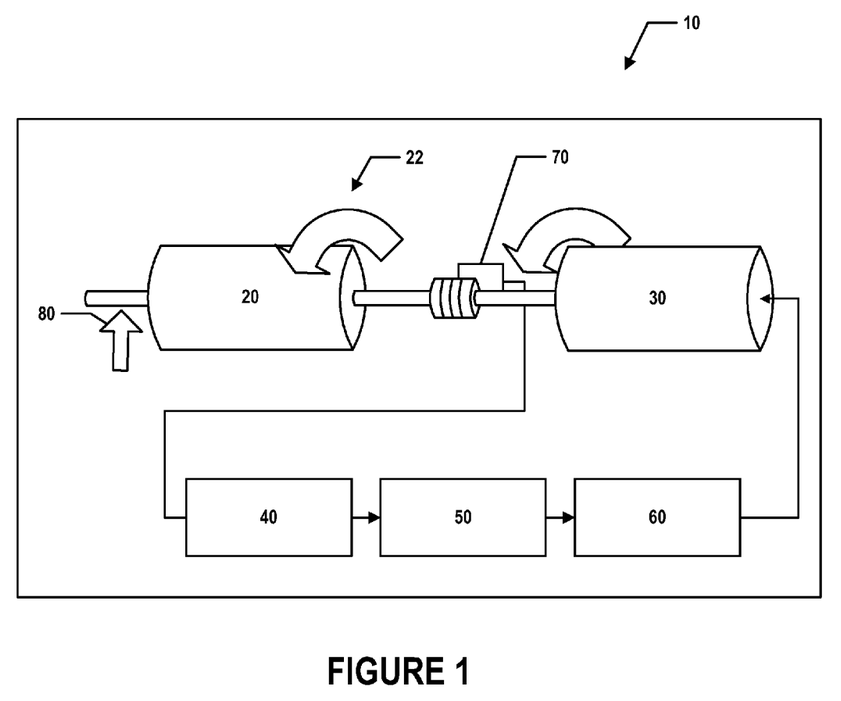
FIG. 1 is a perspective view of the spindle system of the present application.
Figure 2:
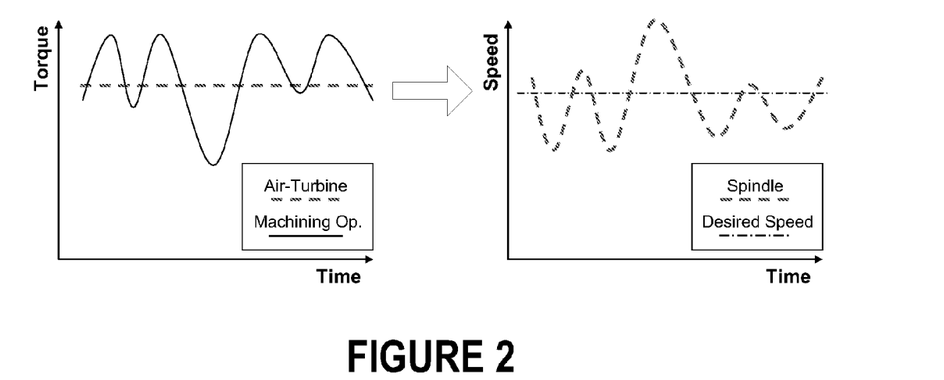
FIG. 2 is a graph of torque and speed characteristics of a spindle without speed control.

Referring to FIG. 1, the spindle system 10 includes an air turbine spindle 20. The air turbine spindle 20 is provided with air power to rotate the spindle 20 at a speed, shown by arrow 22 in FIG. 1.

Figure 3:
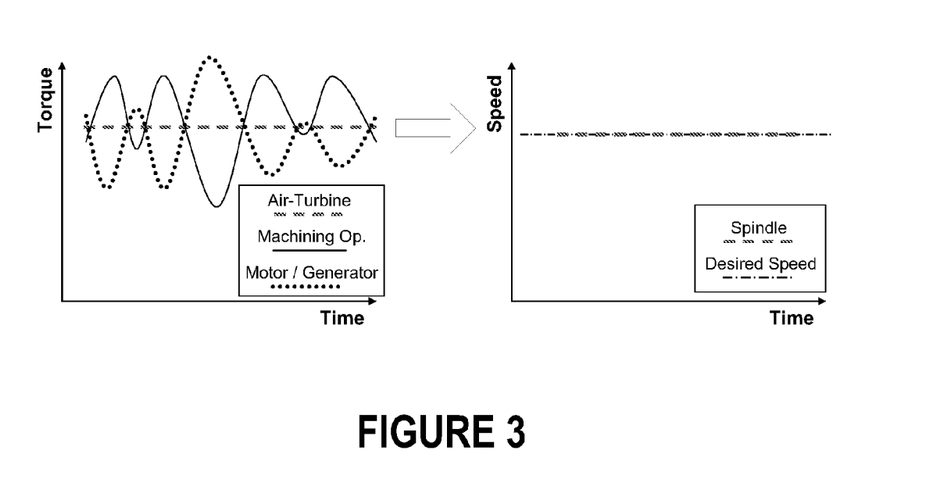
FIG. 3 is a graph of torque and speed characteristics of a spindle with speed control.

The spindle system 10 further comprises an electromagnetic device 30 coupled to or integrated with the spindle 20. That is, the shaft of the turbine may be separate from, but coupled to, the shaft associated with the electromagnetic device, or the spindle may comprise a single shaft that is integral to both the turbine and the electromagnetic device. The electromagnetic device 30 may comprise an electric motor, such as an AC motor, DC motor (brushed, or brushless) or an electric generator, for example. The electromagnetic device 30 provides speed control to the spindle system 10 by applying a torque to the spindle 20, which is shown in FIG. 3, and which will be described in detail below.

Turning again to FIG. 1, the spindle system 10 further comprises a tachometer 40 for sensing the rotational speed of the spindle 20, and generating a measurement associated with the rotational speed. The tachometer 40 may produce a number of different signals that may be used to represent the spindle speed such as a pulse train, an analog voltage, or a digital value, for example. It should be understood that any other instrument for measuring rotational speed may also be used. As an alternative, an instrument to measure both the rotational speed and positional information about the spindle 20, such as an incremental encoder may be used. The incremental encoder preferably includes three channels for tracking speed and positional information: two channels provide a quadrature pulse trains (where the relative phase indicates direction of rotation) and a third channel provides rotational position, preferably by providing a single pulse indicative of a "home" location, or zero degree reference point.

In a preferred embodiment, the tachometer 40 includes an optical sensor 70, which may be located between the spindle 20 and the electromagnetic device 30. Alternatively, the optical sensor 70 may be located anywhere on the spindle 20 or electromagnetic device 30 where it may obtain an accurate measurement of the rotational speed. The optical sensor 70 responds to a plurality of dark spots (not shown) located on the spindle to generate a pulse train that varies according to the spindle rotational speed. Alternatively, a magnetic sensor may be used in conjunction with magnetized portions of the spindle in order to generate a pulse train representative of the spindle speed. As shown in FIG. 1, the tachometer 40, the spindle 20, and the electromagnetic device 30 may be located within a single housing. Alternatively, the tachometer 40, the spindle 20, and the electromagnetic device 30 may be located in separate housings.

The spindle system 10 further comprises a controller 50 connected to the tachometer 40. The controller 50 obtains the rotational speed measurement generated by the tachometer 40. In response to the measurement, the controller 50 adjusts the amount of torque that the electromagnetic device 30 supplies to the spindle 20 to change the rotational speed of the spindle 20 to a desired speed. Preferably, the controller obtains the desired speed from the CNC. Alternatively, the controller may obtain the desired speed from a separate HMI.

The controller 50 may be designed using a number of control methods, which are described in detail below. Numerous controller designs are well-known, including the standard Proportional Integral Derivative (PID) controller. A basic PID controller is governed by the following equation:

$$CO = K_p e + K_i \int e \, dt + K_d \frac{de}{dt}$$

where CO is the control output, e is the error (i.e., desired spindle speed−actual spindle speed), and $K_p$, $K_i$, and $K_d$ are the proportional, integral, and derivative gains.

Figure 4A:
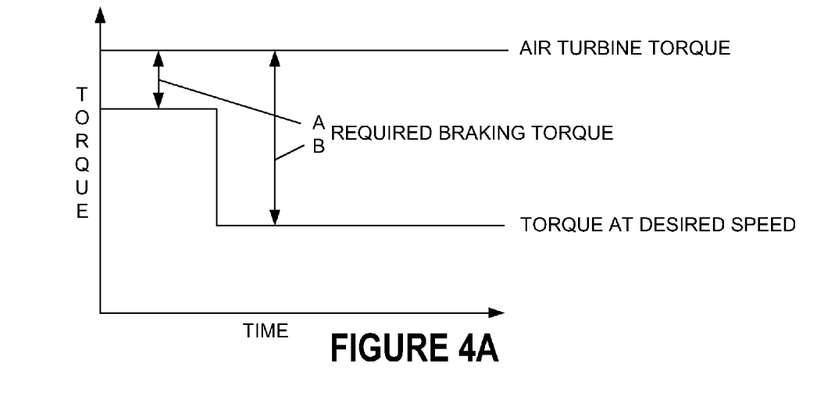
FIGS. 4A and 4B are graphs depicting ranges of torque applied to a spindle by different components of the spindle system.

In one embodiment, the controller 50 controls the speed of the spindle 20 by using the electromagnetic device 30 as a passive brake. In this embodiment, the air pressure supplied to the spindle 20 is constant, as shown in FIG. 4A, and the speed 22 of the spindle 20 is controlled by using the electromagnetic device 30 to dissipate the back-EMF generated by the electromagnetic device 30 across load resistors. The required braking will vary, depending upon the desired spindle speed, as shown by points A and B in FIG. 4A.

The amount of braking is driven by the amount of braking torque, $T_{brake}$ caused by energy dissipation, $P_{brake}$, across the load resistors:

$$T_{brake} = 2\pi * N * P_{brake}$$

$$P_{brake} = V_{emf}^2 * R_{load}$$

$$V_{emf} = k_{emf} * N.$$

where $V_{emf}$ is the back-EMF of the electric motor, $R_{load}$ is the load resistance, $k_{emf}$ is the back-EMF constant of the electromagnetic device 30, and N is the spindle speed.

In one embodiment, the braking torque can be controlled by varying the load resistance. This may be accomplished through the use of variable resistors, potentiometers, or a bank of digitally controlled resistors that may be selectively placed into the load resistance. In an alternative embodiment, the braking torque can be controlled using pulse width modulation (PWM) to regulate the current through the load resistance. With PWM, the full braking torque is pulsed on and off at a high frequency, with the duty cycle of the pulse determining the effective amount of braking.

The controller 50 can also control speed using the electromagnetic device 30 for both adding and subtracting torque. In this method, the pressure to the air turbine remains fixed and the speed is controlled using the electromagnetic device 30. However, in this method, the controller 50 is used to actively control speed by applying current to the electromagnetic device 30 to cause acceleration or deceleration of the spindle 20.

In an alternative embodiment, the controller 50 may control speed by using both pressure modulation for the air turbine spindle 20 and passive braking using the electromagnetic device 30. In this embodiment, the pressure to the air turbine is regulated based on the desired spindle speed. The overall required electromagnetic braking torque is thus reduced as the desired spindle speed changes.

In this embodiment, a single input, multiple output (SIMO) type controller may be used in the spindle system 10. One example of a simple SIMO controller can be given by the following equations:

$$CO_{pressure} = K_{pp} N_{desired}$$

$$CO_{motor} = K_{pm} e + K_{im} \int e \, dt + K_{dm} \frac{de}{dt}$$

Figure 4B:
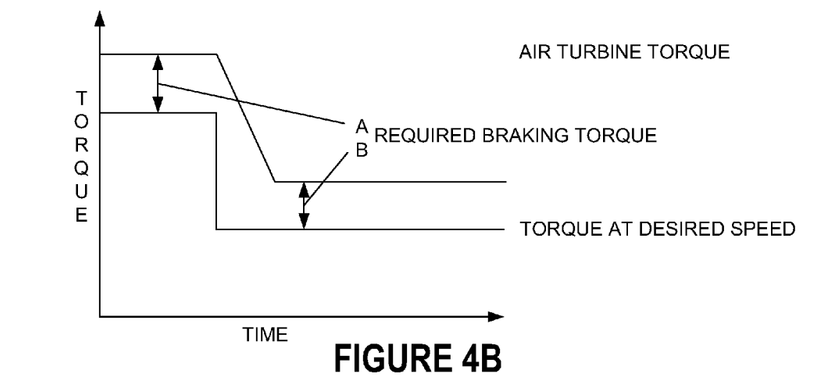

In this example, the air pressure control signal $CO_{pressure}$ is set based only upon the desired spindle speed without using spindle-speed measurement feedback, while the electromagnetic device 30 control signal $CO_{motor}$ is used to adjust either a braking generator or an active motor so as to achieve the desired spindle speed (preferably through the use of a PID control algorithm). As shown in FIG. 4B, by modulating the air pressure according to the desired spindle speed, the amount of electromagnetic braking torque is reduced when the desired spindle speed varies, as seen by points A and B in FIG. 4B. In this embodiment, because the air pressure control signal is generated independently, the air pressure modulation may be performed by the CNC device.

Figure 5:
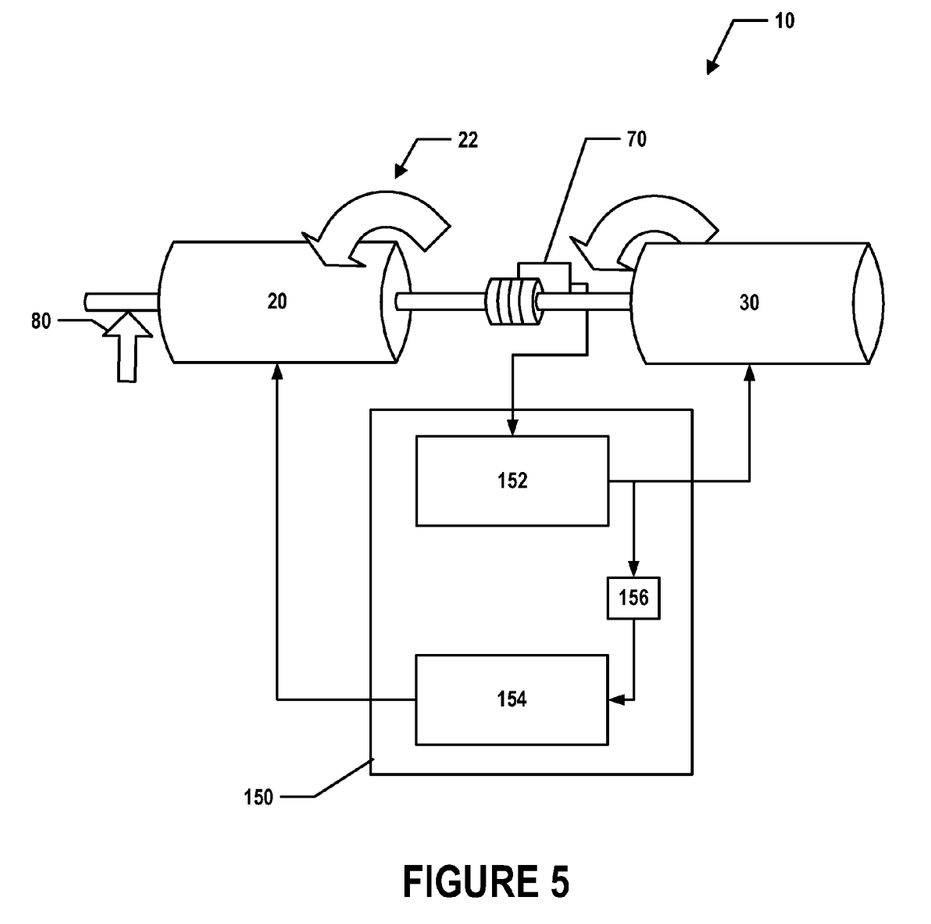
FIG. 5 shows an alternate embodiment of the controller shown in FIG. 1.

FIG. 5 illustrates one embodiment of the controller 150 described herein. The controller 150 may include an electromagnetic device control 152 for controlling the amount of torque applied by the electromagnetic device to the spindle 20, and an air control 154 for controlling the amount of air supplied to the spindle 20. The electromagnetic device control 152 and air control 154 are connected by a low pass filter 156. The electromagnetic device control 152 and air control 154 work together to keep the spindle 20 rotating at the desired speed. The low pass filter provides a time average of the control signal provided to the electromagnetic device. If the time averaged signal indicates that a certain amount of torque (negative torque, in the case of a braking generator, or positive or negative torque in the case of a motor drive) is being consistently provided to the electromagnetic device, then the air pressure is modulated so that the air spindle provides that torque. As the air spindle adjusts to the new pressure, the electromagnetic control is adjusted according to the tachometer feedback signal. The low-pass filtering may be accomplished using well known digital or analog techniques.

Figure 6:
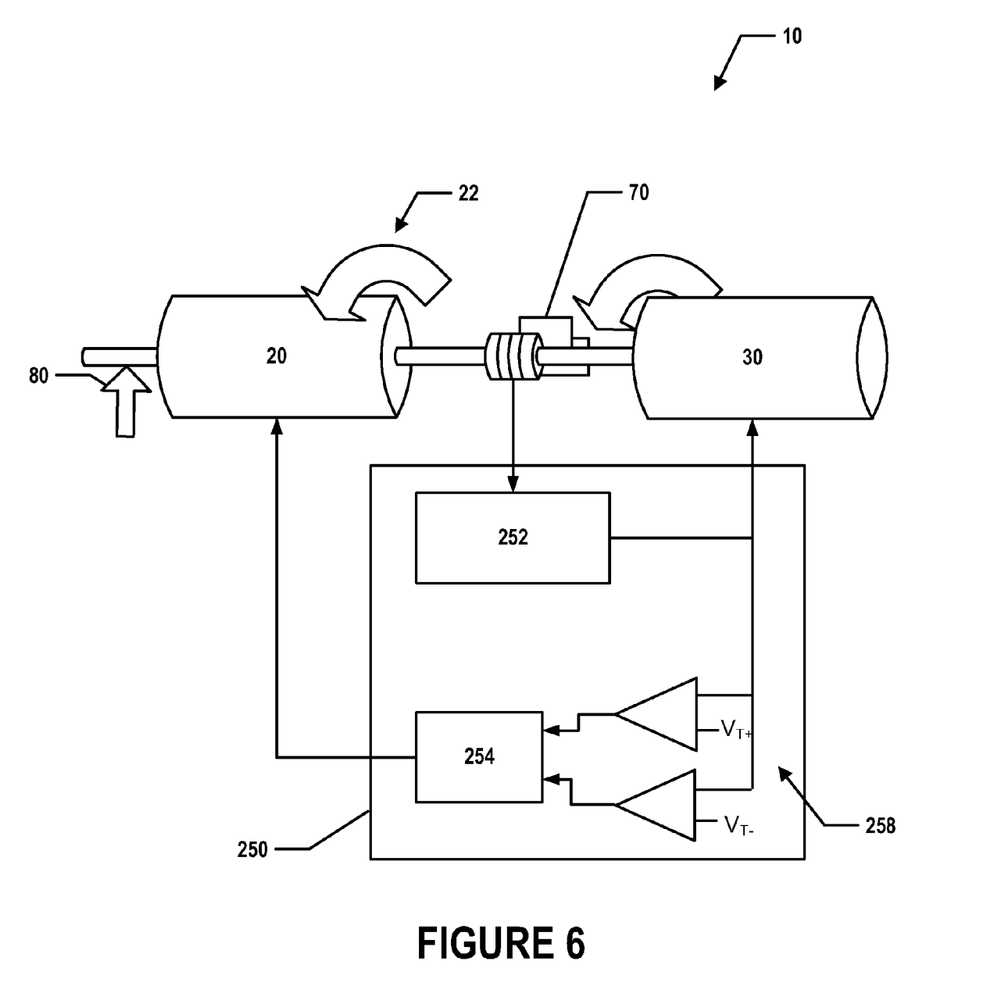
FIG. 6 shows an alternate embodiment of the controller shown in FIG. 1; and, FIG. 7 depicts a flow diagram of one preferred method of spindle speed control.

FIG. 6 illustrates yet another embodiment of an air spindle speed control system. The controller 250 may include an electromagnetic device control 252 for controlling the amount of torque applied to the spindle 20 via the electromagnetic device 30, and an air control 254 for controlling the pressure of the air supplied to the spindle turbine 20. The electromagnetic device control 252 and air control 254 are interconnected by a thresholding device 258. The electromagnetic device control 252 and air control 254 work together to keep the spindle 20 rotating at the desired speed. The electromagnetic device control 252 controls the amount of torque that the electromagnetic device 30 supplies to the spindle 20.

For a situation where braking occurs, if the needed torque becomes too high or too low, the threshold is exceeded and a signal is sent to the air control 254. For a situation where the electromagnetic device can either add or subtract torque, if the needed torque becomes too high, the positive torque threshold or negative torque threshold is exceeded and a signal is sent to the air control 254. The air control 254 then adjusts the amount of air supplied to the spindle 20 by a step adjustment to bring the torque supplied by the electromagnetic device 30 below the threshold.

The controllers 50, 150, 250 may be implemented using analog circuits, digital circuits, or a combination thereof. Specifically, the controller may include operational amplifiers arranged to achieve a PID function, or variation thereof. The controllers may also be implemented using a microcontroller or microprocessor.

The spindle system 10 further includes a drive system 60. The drive system 60 provides the appropriate electronics to control the electromagnetic device 30. In embodiments where the electromagnetic device is a generator providing a braking torque, the drive system contains the load resistors, PWM controller, and other components required to interface with the generator. In embodiments where the electromagnetic device is an electric motor, the drive system 60 includes the necessary electronics to control the motor, which may be an AC motor (e.g., synchronous, asynchronous, induction, etc.) or a DC motor (e.g., a brushed or brushless motor). The controller 50 adjusts the torque provided by the drive system 60 in response to the measurement generated by the tachometer 40.

In operation, air power is supplied to the spindle 20 which rotates the spindle 20 at a speed 22. As stated above, the spindle 20 has a desired speed or set-point, which is communicated to the controller 50. The controller 50 compares the desired speed of the spindle to the measurement generated by the tachometer 40. In response, the controller 50 adjusts the drive system 60 to apply the needed, positive or negative, torque to the spindle 20 so that the rotational speed 22 of the spindle 20 matches the desired speed. Equilibrium is reached where the air turbine spindle 20 is adjusted by the appropriate amount of torque from the electromagnetic device 30 to spin at the desired speed, as shown in FIG. 3.

Figure 7:
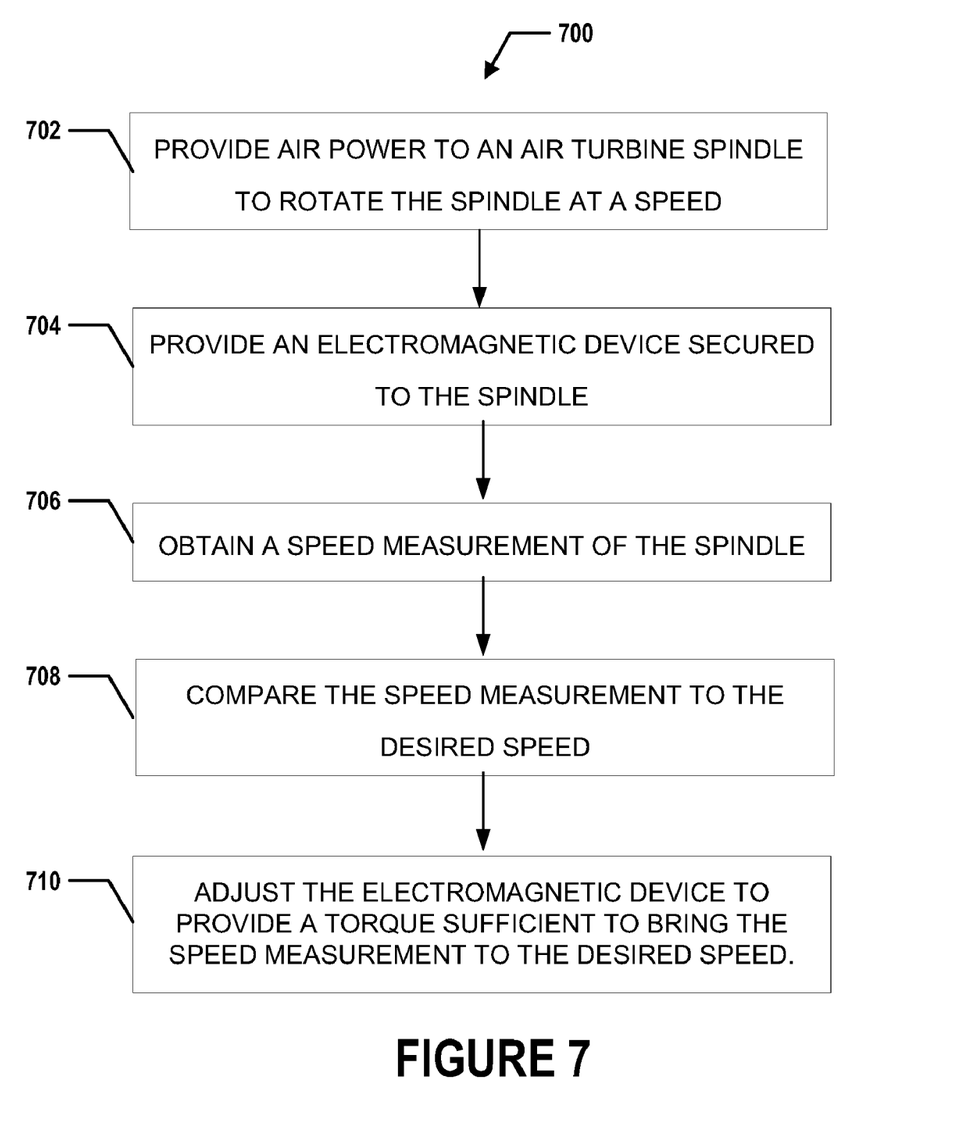

A preferred method 700 will now be described with respect to FIG. 7. At step 702, air power in the form of compressed air is provided to the air turbine to cause the spindle to rotate at a speed. The speed may be at or near the desired speed, or may be biased at a speed greater or less than the desired speed, depending on the embodiment. At step 704, the electromagnetic device is provided that will be used to adjust the spindle speed. At step 706, the spindle speed measurement is obtained. Preferably, a tachometer (e.g., an optical or magnetic sensor) is used to generate a measurement of the revolutions per minute (RPM). At step 708 the speed measurement is compared to the desired speed set-point. The comparison is preferably performed by a PID controller or other controller as described above. At step 710, the electromagnetic device is adjusted, preferably by way of a suitable drive circuit, to provide a torque so that the net torque is sufficient to drive the spindle at the desired speed. In alternative embodiments, the method may include modulating the air pressure via the controller, which may have the effect of lessening the torque applied by the electromagnetic device.

Machining operations (e.g., milling, drilling, turning, etc.) may then be performed during which the machining process imparts a disturbance torque 80 onto the spindle system 10, as shown in FIG. 3. A disturbance torque 80 may arise during operation of the spindle 20, as the operating conditions vary according to the details of the machining process being performed. The value of the disturbance torque 80 varies during a given process and cannot be predicted with sufficient accuracy to provide information that would allow the spindle speed to be controlled accurately. As a result, the tachometer 40 may generate a measurement of the speed of the spindle 20. The measurement will reflect the speed change due to the disturbance torque 80, and the controller 50 reacts to the change in the speed measurement by adjusting the drive system 60 such that equilibrium is again reached. The combination of the air spindle torque, the disturbance torque 80, and the torque from the electromagnetic device 30 results in the desired spindle speed.

The disturbance torque 80 may vary over time, and the controller 50 may constantly react, thereby maintaining the desired spindle speed during the machining operation. The torque applied to the spindle 20 by the electromagnetic device 30 is preferably at least large enough to compensate for the disturbance torque 80 imparted on the spindle system to bring the system back to its equilibrium. In some embodiments, the varying disturbance torque 80 may account for approximately 20% of the total torque applied to the spindle 20. Thus, the electromagnetic device 30 may be relatively small in size compared to the spindle 20.

In embodiments using a braking generator, the torque applied to the spindle 20 by the electromagnetic device 30 is preferably at least equal to the maximum anticipated disturbance torque to be imparted onto the spindle system 10. Prior to the application of the disturbance force, a braking torque is applied, thereby counteracting the air turbine, to slow the speed of the spindle to the desired speed. As the disturbance torque 80 is applied, the braking action is reduced responsive to the controller signal derived from the spindle speed measurement, thereby allowing the torque from the air turbine to counteract the disturbance torque 80.

In embodiments using an electric motor that can provide positive and negative accelerating torque, the motor is preferably able to provide at least one half of the maximum anticipated disturbance torque (in both directions). That is, the air turbine may provide an amount of torque greater than that necessary to achieve the desired spindle speed, but it is counteracted by a negative braking torque. Then, when the disturbance torque 80 is applied, the braking torque of the electromagnetic device 30 is decreased as required. If the disturbance torque continues to increase, the electromagnetic device then provides a positive torque to maintain the desired speed. Thus, the motor may be sized to be approximately one half of the anticipated disturbance torque.

In some embodiments, the electromagnetic device is sized so that the available torque exceeds the maximum anticipated disturbance torque, thereby ensuring that the electromagnetic device can quickly adjust the speed, and can quickly counteract any disturbance torque.

In one preferred embodiment, the spindle system 10 may be used in micro-scale machining operations. Those operations involve high spindle speeds, low power requirements and high accuracy requirements. The application may be embodied in a small, high-speed, low-power spindle package that is implemented for use with micro-scale machining operations. However, it should be understood that the present application may also be implemented in any other machining operations.

The spindle system 10 provides low heat generation. Air turbines create very little heat and the electromagnetic device is preferably sized to deal with the disturbance torques from the machining operations, and are smaller than systems that rely on an electric motor as a primary drive. This minimizes the power requirements of the system, and therefore its heat generation is low.

The spindle system 10 also achieves high bandwidth control. Modulation of air pressure to control the speed of an air-turbine spindle is limited by the compressibility of air. However, the electromagnetic device does not have this limitation, and therefore the system can achieve high bandwidth.

The spindle system 10 further provides high speed capability. Large electric motors, as needed when used as the primary motor, have speed limitations due to rotational inertia. Air turbines and the relatively smaller electromagnetic devices used in the present application do not have as significant a limitation in this regard. As such, spindle speeds in the hundreds of thousands of RPM may be achieved and accurately controlled. Some preferred embodiments operate in the range of 100,000 RPM to 500,000 RPM. Higher or lower rates of revolution are also attainable.

Further, the spindle system 10 uses smaller control electronics and support systems. Large electric motors, as needed when used as the primary motor, require large drive systems and support infrastructure, such as chillers, to dissipate heat. Air turbines and the electromagnetic device used in the present application require a much smaller drive system and therefore do not need a chiller.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present application. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present invention includes any other applications in which embodiment of the above devices and methods are used. The scope of the embodiments of the present invention should be determined with reference to claims associated with these embodiments, along with the full scope of equivalents to which such claims are entitled.

We claim:

1. An apparatus for providing speed control to a spindle system comprising:
    an air turbine spindle having a shaft and a rotational speed;
    a tachometer for generating a measurement of the rotational speed of the spindle; and,
    an electromagnetic device coupled to the spindle for applying a rotational torque to the shaft of the spindle, wherein the torque is applied in response to the measurement to adjust the rotational speed of the spindle to a desired rotational speed.

2. The apparatus of claim 1 further comprising a drive system for powering the electromagnetic device.

3. The apparatus of claim 1 further comprising a controller for adjusting the amount of rotational torque that the electromagnetic device supplies to the spindle shaft in response to the measurement.

4. The apparatus of claim 3 wherein the controller further controls the amount of air provided to the air turbine spindle.

5. The apparatus of claim 1 wherein the electromagnetic device is either an electric motor or a generator.

6. The apparatus of claim 1 wherein the tachometer is an optical sensor.

7. The apparatus of claim 1 wherein a disturbance torque applied to the spindle shaft is counteracted by the rotational torque provided by the electromagnetic device.

8. The apparatus of claim 7 wherein the amount of rotational torque provided by the electromagnetic device is substantially equal to the disturbance torque.

9. The apparatus of claim 1 wherein the spindle, the electromagnetic device, and the tachometer are located within a single housing.

10. An apparatus for providing speed control to a spindle system comprising:
    an air turbine spindle having a shaft and a rotational speed;
    an electromagnetic device coupled to the shaft of the spindle for creating a torque to maintain a desired rotational speed of the spindle;
    a tachometer for generating a measurement of the rotational speed of the spindle;
    a drive system for powering the electromagnetic device; and
    a controller for adjusting the drive system in response to the measurement;
    wherein the electromagnetic device uses the power provided by the drive system to apply a rotational torque to the shaft of the spindle to change the rotational speed of the spindle to the desired rotational speed.

11. The apparatus of claim 10 wherein the electromagnetic device is a motor or generator.

12. The apparatus of claim 10 wherein the tachometer is an optical sensor.

13. The apparatus of claim 10 wherein when a disturbance torque is applied to the spindle system, the electromagnetic device applies a torque to the spindle shaft in response to a new measurement generated by the tachometer sufficient to change the rotational speed of the spindle to the desired rotational speed.

14. The apparatus of claim 10 wherein the spindle, the electromagnetic device, and the tachometer are located within a single housing.

15. The apparatus of claim 10 wherein the controller further controls the amount of air provided to the air turbine spindle.

16. An apparatus for providing speed control to a spindle system comprising:
   an air turbine spindle having a shaft and a rotational speed;
   a disturbance torque applied to the spindle shaft;
   a tachometer for generating a measurement of the rotational speed of the spindle;
   an electromagnetic device coupled to the shaft of the spindle for creating a torque applied to the spindle that counteracts the disturbance torque, wherein the torque is applied in response to the measurement to adjust the rotational speed of the spindle to a desired rotational speed.

17. The apparatus of claim 16 wherein the amount of torque provided by the electromagnetic device is substantially equal to the disturbance torque.

18. The apparatus of claim 16 further comprising:
   a drive system for powering the electromagnetic device; and,
   a controller for adjusting the drive system in response to the measurement.

19. The apparatus of claim 18 wherein the controller further controls the amount of air provided to the air turbine spindle.

20. The apparatus of claim 16 wherein a combination of air spindle torque, the disturbance torque and the torque from the electromagnetic device provides the desired spindle speed.

* * * * *